United States Patent
Rube

[15] 3,680,953
[45] Aug. 1, 1972

[54] SLIDE PROJECTOR AND TRAY THEREFOR

[72] Inventor: Helmut Rube, Endersbach, Germany

[73] Assignee: Robert Bosch Photokino, GmbH, Stuttgart-Untertuerkheim, Germany

[22] Filed: Nov. 26, 1969

[21] Appl. No.: 880,229

[30] Foreign Application Priority Data

April 28, 1968 Germany ............. P 18 11 332.1

[52] U.S. Cl. .................................. 353/117, 206/62
[51] Int. Cl. .......................................... G03b 23/06
[58] Field of Search ................. 353/117; 266/62, 73

[56] References Cited

UNITED STATES PATENTS

| | | | |
|---|---|---|---|
| 3,402,489 | 9/1968 | Schlessel | 40/79 |
| 2,748,653 | 6/1956 | Pollan | 353/117 |
| 3,469,910 | 9/1969 | Bodalich | 353/117 |
| 1,605,245 | 11/1926 | Lehmann | 353/117 |
| 3,343,454 | 9/1967 | Mahoney | 353/117 |
| 3,143,036 | 8/1964 | Rohmann | 353/116 |

*Primary Examiner*—Leonard Forman
*Assistant Examiner*—A. J. Mirabito
*Attorney*—Michael S. Striker

[57] ABSTRACT

A circular tray for slides which comprises a cupped section rotatable with reference to a concentric core to place successive slides into registry with a slot provided in a disk-shaped flange of the core. The slides are accommodated in compartments extending radially inwardly from a cylindrical wall of the cupped section and the tray can be mounted in a channel of the projector housing only when it is positioned in a predetermined orientation with reference to the projector and when its cupped portion is held in a predetermined angular position relative to the core.

12 Claims, 2 Drawing Figures

INVENTOR:
HELMUT RUBE
BY
HIS ATTORNEY 3,680,953

SLIDE PROJECTOR AND TRAY THEREFOR

BACKGROUND OF THE INVENTION

The present invention relates to projectors for photographic transparencies (commonly known as slides) and to trays for use in such projectors. More particularly, the invention relates to improvements in circular trays wherein the slides are disposed in radially extending compartments and are indexible into registry with the slide changer in the housing of a projector.

Presently known circular trays consist basically of a single piece of synthetic thermoplastic material and are produced in injection molding or casting machines. A drawback of such circular trays is that the forms or dies which are used in their manufacture are quite complicated and hence expensive, and that the machines for their production must be supervised and serviced by highly skilled workmen. Moreover, the configuration and/or other characteristics of one-piece circular trays cannot be selected at will so that such trays are not sufficiently versatile unless they are assembled with a host of separately manufactured parts.

SUMMARY OF THE INVENTION

An object of the invention is to provide a novel and improved circular tray for framed photographic transparencies or slides which is cheaper and more versatile than presently known circular trays.

Another object of the invention is to provide a circular tray which can accommodate a substantial number of conventional slides in a small area, which can be used to permit projection of images of slides in a predetermined sequence or in reverse order, and which can be rapidly and conveniently taken apart and reassembled to respectively permit insertion or withdrawal of slides and the mounting on or in the housing of a slide projector.

A further object of the invention is to provide a novel slide projector for use with the improved circular tray.

One feature of the invention resides in the provision of a circular tray for slides which comprises a discrete first section having an endless circumferential wall, a discrete second section having a preferably cylindrical core which is spaced from and is substantially concentrically surrounded by the cylindrical wall, coupling means provided on at least one of the sections for separably connecting the sections to each other, preferably in such a way that the sections are rotatable with reference to each other about the axis of the cylindrical wall, and a plurality of partitioning means provided on at least one of the sections (preferably on the cylindrical wall of the first section) and defining a plurality of slide-accommodating compartments extending substantially radially of and disposed between the core and the cylindrical wall.

The housing of the projector which can be used with the improved tray is provided with locating means cooperating with complementary locating means on the tray to permit separation of or attachment of the tray when the latter is positioned in a predetermined orientation with reference to the housing and when the two sections of the tray are located in predetermined angular positions relative to each other.

The novel features which are considered as characteristic of the invention are set forth in particular in the appended claims. The improved slide projector itself, however, both as to its construction and its mode of operation, together with additional features and advantages of the improved tray, will be best understood upon perusal of the following detailed description of certain specific embodiments with reference to the accompanying drawing.

DESCRIPTION OF THE PREFERRED EMBODIMENTS

Figure 1:
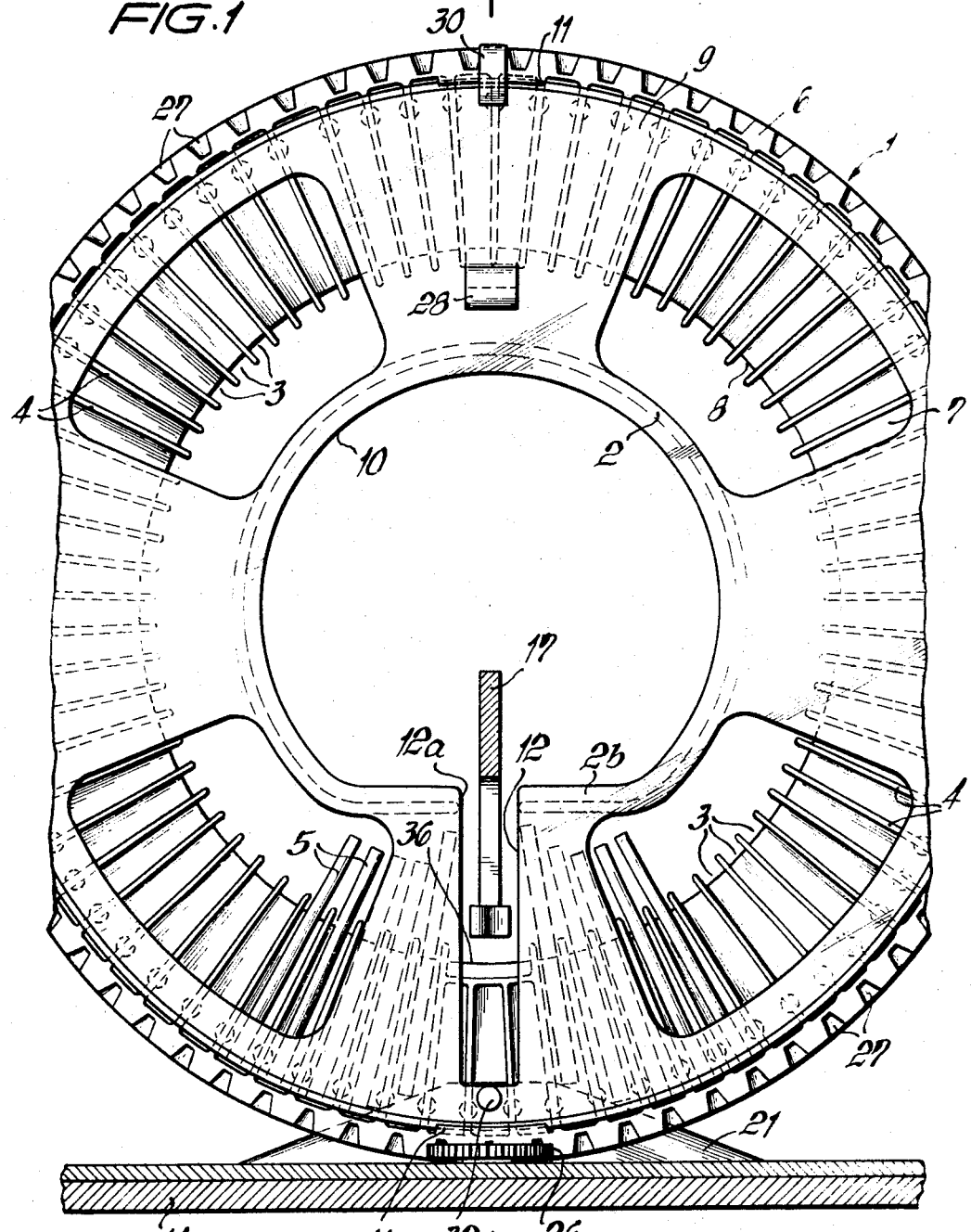
FIG. 1 is a fragmentary end elevational view of a circular tray which embodies the invention and a fragmentary transverse vertical sectional view of a slide projector for use with the tray, the section being taken in the direction of arrows as seen from the line I—I of FIG. 2.

The drawing illustrates a portion of a slide projector for use with circular magazines or trays wherein the slides 5 are located in radially extending planes. The improved tray comprises two main parts or sections including a substantially cupped first section 1 and a second section having a substantially cylindrical core 2. These sections preferably consist of synthetic thermoplastic material and are produced by extrusion or by a casting process. The section 1 is formed with radially extending equidistant partitions 4 which define compartments 3 for slides 5.

The section 1 further includes a cylindrical peripheral wall 6 which is concentric with and spacedly surrounds the core 2, and an end wall or bottom wall 7 which is integral with the wall 6. The end wall 7 has a concentric opening 8 (see particularly FIG. 2) and the partitions 4 are integral with and extend radially inwardly from the cylindrical wall 6. These partitions may be formed simultaneously with the wall 6 or are permanently bonded thereto in a subsequent step. The height of the partitions 4, as considered in the radial direction of the tray, is less than the height of the slides 5.

The fact that the tray comprises two discrete sections 1 and 2 which are produced independently of each other and are thereupon assembled to form a magazine for slides constitutes a first novel and advantageous feature of the present invention. In this way, the forms and machines which are used for the production of the tray are less expensive and simpler than the forms which are used for the production of one-piece trays. Furthermore, such construction enables the improved tray to perform functions which cannot be performed by one-piece trays, particularly as regards the ease of inserting or removing slides and of moving the slides into registry with the slide changer 17 of the projector. In the illustrated embodiment, the second section further includes a substantially disk-shaped portion or flange 9 which is integral with and extends radially outwardly from one axial end of the core 2. The flange 9 resembles a spoked wheel and is parallel to the end wall 7. It is formed with a concentric opening 10 which is best shown in FIG. 1. The marginal portion of the flange 9 is fitted into the circular edge portion at the open end of the cylindrical wall 6 which latter is provided with several relatively short elastically deformable coupling projections or lugs 11 each overlapping the adjacent part of the flange 9 to thereby hold the tray in assembled condition but to permit ready separation of the two sections for the purpose of insertion or removal of slides 5. The external diameter of the flange 9 at least approximates the internal diameter of the free edge portion of the cylindrical wall 6 and such marginal portion constitutes a simple bearing on which the section 1 can rotate relative to the core 2, or vice versa. The coupling lugs 11 are preferably equidistant from each other. The arrangement is preferably such that, when the flange 9 is properly retained by the lugs 11, it abuts against the adjacent edge faces of the partitions 4. The forward end portion of the core 2, namely, that end portion which is adjacent to the wall 7, is preferably of conical shape, as shown at 2a in FIG. 2, to facilitate introduction of the core into the space between the slides 5 in the compartments 3.

In addition to serving as a bearing for the section 1, the flange 9 of the core 2 serves the additional purpose of normally preventing uncontrolled escape of slides 5 from their respective compartments 3. This is particularly important if the tray is designed to be installed in the housing of the slide projector in such a position that the common axis of its sections 1, 2 is located in a horizontal plane, i.e., that the tray is held in a vertical or nearly vertical plane. The core 2 and its flange 9 are provided with registering radially extending cutouts or slots 12, 12a which permit withdrawal and reintroduction of successive slides by the slide changer 17 when the tray is properly mounted in the housing of the slide projector.

The housing of the slide projector constitutes a support for the tray and defines a channel 13 which extends in parallelism with the optical axis and serves to accommodate part of the tray in such a way that the common axis of the two sections is located in a horizontal plane at right angles to the optical axis of the projector. When the tray is properly inserted into the channel 13, a portion of the cylindrical wall 6 is adjacent to the bottom wall 14 of the housing and the axis of the tray is parallel to such bottom portion. One side of the channel 13 is flanked by a vertical wall 15 (see FIG. 2) which is formed with a vertical slot 16 for the slide changer 17. This slot 16 registers with the slots 12, 12a when the tray is properly mounted in the housing. A second vertical wall 18 of the housing flanks the other side of the channel 13; this wall 18 is provided with a recess or space 19 for a portion of the slide changer 17.

Figure 2:
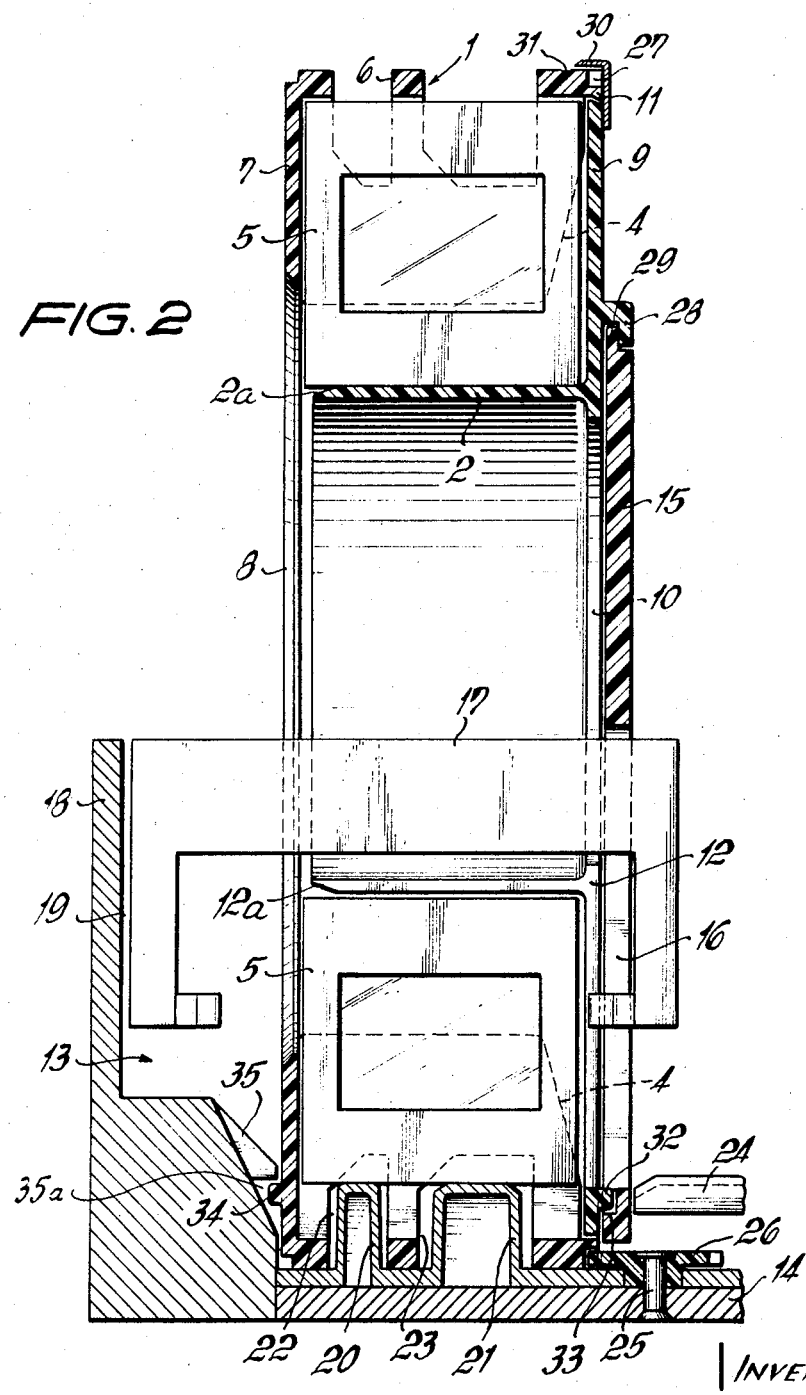
FIG. 2 is a vertical sectional view as seen in the direction of arrows from the line II—II of FIG. 1.

The bottom wall 14 of the housing is integral with or is permanently or separably connected with two suitably configured lifting or displacing means or ramps 20, 21 each of which is provided with a substantially horizontal top land and with two inclined surfaces (see the ramp 21 in FIG. 1) causing successive slides to move radially inwardly toward the axis of the tray in response to rotation of the section 1 with reference to the core 2. The ramps 20, 21 extend lengthwise of the channel 13 and into circumferential grooves 22, 23 provided in the cylindrical wall 6 of the section 1. As shown in FIG. 2, the grooves 22, 23 extend into the outermost portions of partitions 4 so that the ramps 20, 21 can displace the slides 5 in the compartments 3. As best shown in the lower part of FIG. 1, a slide which travels toward registry with the slots 12, 12a and 16 automatically moves upwardly (i.e., toward the common axis of the section 1 and core 2) when the section 1 is rotated with reference to the core whereby such slide reaches the top lands of the ramps 20, 21 and is in the range of the slide changer 17 so that it can be transported from its compartment 3 toward the projection position in which it registers with the optical system of the projector and extends at right angles across the optical axis of the projection lens, and thereupon back into the respective compartment 3. The lower edge of the frame on the thus raised slide 5 is then aligned with a stationary guide rail 24 (FIG. 2) which supports the slide from below during transport from the respective compartment 3 to projection position and vice versa. The upper surface of the rail 24 is channeled and this rail defines a straight path for travel of slides 5 with the slide changer 17. The section 1 can be rotated clockwise or counterclockwise, as viewed in FIG. 1.

The core 2 of the tray is provided with a flat 2b which is inwardly adjacent to the slot 12 and defines the slot 12a. The flat 2b comprises two parts which flank the slide changer 17 when the tray is properly inserted into the channel 13. The purpose of this flat 2b is to permit displacement of slides 5 in radial direction towards the axis of the tray by the ramps 20, 21. The remaining part of the core 2 is concentric with the wall 6 and its distance from the wall 6 corresponds roughly to the height of a slide 5, as considered in radial direction of the tray. The flat 2b permits at least one slide 5 to move away from the cylindrical wall 6.

The bottom wall 14 of the housing of the slide projector supports a vertical shaft 25 (FIG. 2) for an indexing gear 26 which mates with a circular toothed rack 27 provided on the edge portion of the cylindrical wall 6. The gear 26 is rotated stepwise in response to manual manipulation or automatic movements of the slide changer 17 to thereby turn the section 1 with reference to the core 2, always through an angle which is necessary to place the next-following slide into registry with the slide changer 17. The arrangement is such that the section 1 is indexed after the slide changer 17 returns a slide into the respective compartment and before the slide changer performs the next working stroke.

The means for properly locating the tray with reference to the housing of the slide projector and for releasably securing the tray to the housing when the tray is positioned in a predetermined orientation comprises a female coupling portion or claw 28 on the flange 9 and a male coupling portion or finger 29 on the vertical wall 15. The finger 29 enters the recess of the claw 28 when the tray is properly inserted into the channel 13. Furthermore, the aforementioned locating means comprises a notch 33 in the lowermost part of the wall 15 and a projection or tooth 32 on the flange 9, as well as a flute or notch 35 in the wall 18 and a further projection or tooth 34 on the end wall 7. When the tooth 34 has moved downwardly beyond the notch 35, the indexing gear 26 meshes with the rack 27 of the cylindrical wall 6. When the claw 28 overlies the finger 29 and the tooth 32 extends into the notch 33, the slots 12, 12a of the flange 9 and core 2 register with the slot 16 of the wall 15. The wall 18 has an arcuate groove 35a in which the tooth 34 moves part of the time when the section 1 is indexed by the gear 26.

The tray is further provided with means for facilitating the placing of the two sections into a predetermined angular position with reference to each other prior to insertion of the tray into the channel 13. Such means comprises an index or pointer 30 on the flange 9 and a second index or pointer 31 on the wall 6. When the index 30 registers with the index 31, and when the claw 28 overlaps the finger 29 of the wall 15, the tooth 32 is received in the notch 33 and the tooth 34 registers with the notch 35. Thus, the tray can be inserted into and withdrawn from the channel 13 only when the two sections assume a predetermined angular position with reference to each other and when the core 2 is in a predetermined orientation with reference to the wall 15. The notch 33 is provided in the wall 15 below the slot 16. The tray is insertable into the channel 13 from above and is withdrawable in response to movement upwardly and away from the bottom wall 14.

FIG. 1 shows that a portion of the section 1 cannot accommodate any slides. This portion is located diametrically opposite the index 31 and is provided with a circumferentially extending bridge or barrier 36 located radially outwardly of the slide changer 17. In the illustrated embodiment, the barrier 36 extends through an angle corresponding to the combined width of three compartments 3 and two partitions 4. This insures that no slides are placed into registry with the slide changer 17 during insertion of the tray into the channel 13.

The operation:

Prior to insertion of a tray into the channel 13, the slide changer 17 is moved to its right-hand end position, as viewed in FIG. 2, so that it does not extend across the space between the walls 15 and 18. The operator makes sure that the index 30 registers with the index 31 and thereupon introduces the tray from above so that the claw 28 overlaps the finger 29 and that the tooth 34 passes through the notch 35 whereby the tooth 32 enters the notch 33. This places the indexing gear 26 into mesh with the rack 27. The partitions which are bridged by the barrier 36 are then located in the slots 12, 12a which register with the slot 16 of the wall 15. During insertion of the tray into the channel 13, the ramps 20, 21 penetrate into the grooves 22, 23 of the wall 6 and of the adjacent partitions 4 but they cannot lift a slide 5 into the range of the slide changer 17 due to the provision of the barrier 36 which extends across the slots 12, 12a and 16. However, the inclined surfaces of the ramps 20, 21 partially lift certain of the slides in the lowermost compartments 3 in a manner as indicated in FIG. 1 by broken lines.

In order to start the projection of images on successive slides, the operator moves the slide changer 17 to the position which is shown in FIG. 2. This causes the gear 26 to index the section 1 with reference to the core 2 through an angle corresponding to the angular distance between the centers of two adjacent compartments 3. The slide changer 17 is them moved to the other end position and back to the position shown in FIG. 2 whereby the section 1 is indexed again and one of the slides 5 reaches the top lands of the ramps 20, 21 and is in registry with the motion transmitting jaws of the slide changer 17. The section 1 may be provided with numerals for each of its compartments 3 to facilitate introduction of slides in a desired sequence. If the slide changer 17 is thereupon again caused to leave the end position shown in FIG. 2, the slide which dwells on the central portions of top lands of the ramps 20, 21 is caused to travel along the guide rail 24 and to the projection position so that its image is projected onto a screen or the like, not shown.

When the slide changer 17 thereupon returns to the position of FIG. 2, the slide is returned from projection position into the respective compartment 3 of the section 1 and this section is thereupon indexed to place the next-following slide into registry with the slide changer. Once the section 1 is rotated through full 360°, the tooth 34 of the wall 7 returns into registry with the notch 35 of the wall 18 so that the operator can readily remove the tray by moving its sections upwardly and away from the bottom wall 14. Of course, the slide changer 17 must be withdrawn to the right of the flange 9, as viewed in FIG. 2, before the tray is free to leave the channel 13.

An important advantage of the improved tray is that its two sections constitute two discrete parts which are manufactured independently of each other. Therefore, these sections can be produced in relatively simple and inexpensive forms, either by casting or by extrusion. Moreover, the tray is capable of performing functions (particularly as regards the facility of insertion and withdrawal of slides and indexing of slides into registry with the slide changer) which cannot be performed by conventional one-piece trays. This is due to the fact that the two sections are rotatable or turnable relative to each other whereby the flange 9 of the core 2 prevents uncontrolled escape or removal of slides from their respective compartments 3 but the operator is still in a position to gain access to the slides simply by withdrawing the flange 9 from the wall 6 in response to the application of a force which suffices to bring about necessary deformation of the lugs 11. The deformability of lugs 11 is preferably such that the two sections can be separated without resorting to any tool or by resorting to readily available rudimentary tools.

It is clear that the improved tray and slide projector are susceptible of many additional modifications without departing from the spirit of my invention. For example, the tray can be mounted for indexing movement of its section 1 about a vertical or substantially vertical axis and the partitions 4 may be provided on the section 2 or in part on section 2 and in part on section 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a slide projector, the combination of a tray support; a circular tray including a first section having a substantially cylindrical wall provided with at least one circumferential groove, a second section having a core spacedly surrounded by said wall, said first section being rotatable with reference to said second section, and partitions provided on said first section and defining a plurality of slide-accommodating compartments extending substantially radially between said wall and said core; cooperating locating means provided on said support and said tray for releasably maintaining said second section in a predetermined position and for permitting rotation of said first section in a predetermined orientation of said tray with reference to said support in which the axis of said first section is substantially horizontal; displacing means provided on said support and extending into said groove to lift successive slides substantially radially toward said core in response to rotation of said first section, said core comprising a first portion which is located relatively close to said wall to thereby hold the slides in adjoining compartments against appreciable movement away from said wall and a second portion which is located in the region of said displacing means and is relatively distant from said wall to permit a slide in at least one adjoining compartment to move upwardly toward said second portion under the action of said displacing means; and guide means provided on said support in alignment with the slide which is lifted by said displacing means.

2. A combination as defined in claim 1, wherein said second section is provided with slot means registering with successive compartments in response to rotation of said first section and being located in the region of said displacing means so that a slide which is moved radially by said displacing means is in a position to be transferred from the respective compartment onto said guide means by way of said slot means.

3. A combination as defined in claim 1, wherein said second section further includes a portion extending from said core toward said wall and overlapping at least a portion of each slide in said compartments.

4. A combination as defined in claim 3, wherein said last mentioned portion is a substantially disk-shaped flange.

5. A combination as defined in claim 3, wherein said last mentioned portion constitutes a bearing supporting said wall for rotational movement of said first section with reference to said second section.

6. A combination as defined in claim 1, wherein said first section further comprises an end wall extending substantially radially inwardly from said circumferential wall and wherein said core comprises a substantially conical end portion adjacent to said end wall.

7. A combination as defined in claim 1, wherein said locating means comprises a projection provided on said second section and a notch provided on said support and registering with said projection in said predetermined orientation of the tray.

8. A combination as defined in claim 1, wherein said locating means comprises a projection provided on said first section and a notch provided on said support and registering with said projection to permit separation of said tray from said support in said predetermined position of said first section.

9. A combination as defined in claim 1, wherein said second section further includes a flange extending substantially radially outwardly from said core and overlapping the slides in said compartments, said second section having slot means which registers with successive compartments in response to rotation of said first section with reference to the second section and further comprising slide changer means mounted on said support and movable in said slot means to transfer slides into and from compartments which register with said slot means.

10. A combination as defined in claim 9, wherein said first section further includes a portion which registers with said slot means in predetermined angular positions of said sections and is free of compartments.

11. A combination as defined in claim 1, wherein said second portion of said core is a flat located in a plane which is substantially parallel to the axis of said wall.

12. A combination as defined in claim 1, wherein said support comprises a wall having a first coupling portion and said second section comprises a second coupling portion engaging with said first coupling portion, said coupling portions forming part of said locating means.

* * * * *